(12) United States Patent
Kohge et al.

(10) Patent No.: US 6,212,447 B1
(45) Date of Patent: Apr. 3, 2001

(54) CONTROL DEVICE FOR AUTOMOBILES

(75) Inventors: Shinichi Kohge; Yuji Kishimoto, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/242,963

(22) PCT Filed: Jun. 30, 1997

(86) PCT No.: PCT/JP97/02260

§ 371 Date: Feb. 26, 1999

§ 102(e) Date: Feb. 26, 1999

(87) PCT Pub. No.: WO99/00287

PCT Pub. Date: Jan. 7, 1999

(51) Int. Cl.[7] .............................. G06F 7/00; G06F 17/00
(52) U.S. Cl. ........................ 701/1; 701/32; 701/35; 701/36; 701/41; 701/102
(58) Field of Search .................... 701/1, 32, 35, 701/36, 41, 102

(56) References Cited

U.S. PATENT DOCUMENTS 5,155,684 * 10/1992 Burke et al. ............... 364/424.02
5,687,081 * 11/1997 Wellman et al. ............ 364/424.07
6,035,252 * 3/2000 Dixon et al. ................... 701/102

FOREIGN PATENT DOCUMENTS

| 58-77630 | 5/1983 | (JP). |
| 63-138401 | 6/1988 | (JP). |
| 1-227833 | 9/1989 | (JP). |
| 3-47471 | 2/1991 | (JP). |
| 8-80860 | 3/1996 | (JP). |
| 8-119132 | 5/1996 | (JP). |

* cited by examiner

Primary Examiner—William A. Cuchlinski, Jr.
Assistant Examiner—Ronnie Mancho
(74) Attorney, Agent, or Firm—Sughrue, Mion, Zinn, Macpeak & Seas, PLLC

(57) ABSTRACT

A non-volatile memory device 80 or 800 is provided, wherein intrinsic information indicating variances of characteristics of individual units is stored in advance in the inexpensive memory device 80 or 800 through a simple processing procedure with a view to adjusting a control quantity with high accuracy upon ordinary control by executing software with a microcomputer 55A or 300A. Thus, a control system for a motor vehicle exhibiting excellent performances can be implemented at low costs, which allows accurate and precise adjustment to be realized through a simplified adjusting step while reducing an extraneous space for adjustment of variance without need for use of any specific part of high precision.

17 Claims, 9 Drawing Sheets

CONTROL DEVICE FOR AUTOMOBILES

TECHNICAL FIELD

The present invention relates to a control system for a motor vehicle which is capable of adjusting variance or dispersion of characteristics intrinsic to individual control units, and more particularly, a control system for a motor vehicle for which reduction in manufacturing cost can be realized without impairing reliability by improving an internal adjusting mechanism.

BACKGROUND TECHNIQUES

In conjunction with the control system for a motor vehicle such as for a power steering system, an engine ignition control system and others, a control system for the motor vehicle which is designed for correcting an error peculiar to the system by resorting to the use of learning function is well known in the art, as is disclosed, for instance, in Japanese Unexamined Patent Application Publication No. 47471/1991 (JP-A-3-47471). However, in the control system for the motor vehicle equipped with such learning function, it is difficult to ensure reliability for the correcting control with high accuracy because of difficulty encountered in setting the conditions for learning.

Under the circumstances, there have been proposed a variety of apparatuses for adjusting variances of characteristics of individual systems in the course of assembling on the production line for ensuring reliability of correction with high accuracy.

In the following, adjustment of dispersion or variance of the characteristic of the control system for the motor vehicle as carried out on the production line and known heretofore will be described by taking as an example a motor-driven power steering control system.

FIG. 7 is a circuit diagram showing a conventional motor-driven power steering control system with several parts being shown in blocks.

Referring to FIG. 7, a steering effort assisting motor 40 (output unit) is electrically driven, being supplied with a motor current IM from a battery 41, for thereby generating an assist torque to be applied to a steering wheel (not shown) of a motor vehicle.

Ripple components of the motor current IM is absorbed by a capacitor 42 of a large capacity (on the order of 1000 $\mu$F. to 3600 $\mu$F.), wherein the motor current IM is detected by means of a shunt resistor 43. One terminal of the capacitor 42 is connected to the ground potential by way of a wiring conductor L1.

Further, the motor current IM is changed in dependence on magnitude and direction of the assist torque by means of a bridge circuit 44 which is constituted by a plurality of semiconductor switching elements (e.g. FETs) Q1 to Q4.

The semiconductor switching elements Q1 to Q4 cooperate to constitute the bridge circuit 44, being interconnected in the form of a bridge circuit by wiring conductor patterns P1 and P2.

The bridge circuit 44 is connected to the shunt resistor 43 via the wiring conductor patterns P1 and P2. Further, the output terminal of the bridge circuit 44 is realized by a wiring conductor pattern P3.

The motor 40 and the battery 41 are connected to the bridge circuit 44 by means of a connector 45 having a plurality of lead terminals. The motor 40, the battery 41, and the connector 45 are interconnected by external wiring conductors L2. The motor current IM can be interrupted by means of a normally opened relay 46 as occasion requires.

The relay 46, the capacitor 42 and the shunt resistor 43 are interconnected by a wiring conductor pattern P4. The connector 45 is connected to the ground potential by a wiring conductor pattern P5. The wiring conductor pattern P3 constituting the output terminals of the bridge circuit 44 is connected to the connector 45.

The motor 40 is driven by a driving circuit 47 by way of the bridge circuit 44. The driving circuit 47 is connected to an excitation coil of the relay 46 by way of a wiring conductor L3 for driving the relay 46. Further, the driving circuit 47 is connected to the bridge circuit 44 via wiring conductors L4.

The motor current IM is detected by a motor current detecting means 48 as a voltage appearing across the shunt resistor 43. The driving circuit 47 and the motor current detecting means 48 constitute peripheral circuit elements of a microcomputer 55 which will be described hereinafter.

A steering torque T applied to the steering wheel is detected by a torque sensor 50, while a speed V of a motor vehicle is detected by a vehicle speed sensor 51.

The microcomputer 55 constitutes an electronic control unit (ECU) in cooperation with input/output control units (input/output interfaces) for arithmetically determining the assist torque on the basis of the steering torque T and the vehicle speed V while generating a rotating direction command Do and a current control quantity Io for controlling the bridge circuit 44 as a driving signal which corresponds to the assist torque and which is derived from a feedback signal indicating the motor current IM, wherein the rotating direction command Do and the current control quantity Io are outputted to the driving circuit 47.

The microcomputer 55 includes a motor current determining means 56, a subtracting means 57 and a PID (proportional-integral-differential) arithmetic means 58.

The motor current determining means 56 is designed to generate the rotating direction command Do for the steering effort assisting motor 40 and a motor current command Im equivalent to the assist torque, while the subtracting means 57 is designed to arithmetically determine a current deviation $\Delta I$ of the motor current IM from the motor current command Im.

The PID arithmetic means 58 arithmetically determines correcting quantities for the P (proportional) term, the I (integral) term and the D (differential) term, respectively, on the basis of the current deviation $\Delta I$, to thereby generate a current control quantity Io corresponding to a PWM (Pulse-Width Modulation) duty ratio.

Further, in addition to an A/D converter, a PWM timer circuit and others, the microcomputer 55 includes a self-diagnosis function known per se for carrying out constantly the self-diagnosis as to whether or not the system is operating normally, wherein upon occurrence of abnormality, the relay 46 is opened by way of the driving circuit 47 to thereby interrupt the motor current IM. The microcomputer 55 is connected to the driving circuit 47 by wiring conductors L5.

Next, description will be directed to operation of the conventional motor-driven power steering control system shown in FIG. 7.

At first, the microcomputer 55 fetches the steering torque T and the vehicle speed V from the outputs of the torque sensor 50 and the vehicle speed sensor 51, respectively, while fetching the motor current IM from the shunt resistor 43 as a feedback input quantity, to thereby arithmetically determine the rotating direction command Do and the current control quantity Io corresponding to the magnitude of the assist torque for the power steering on the basis of the steering torque T, the vehicle speed V and the motor current IM, wherein the rotating direction command Do and the current control quantity Io as determined are outputted to the driving circuit 47 via the wiring conductors L5.

In the steady driving state, the normally opened relay 46 is closed by the driving circuit 47 in response to the command supplied through the wiring conductor L3. However, upon inputting of the rotating direction command Do and the current control quantity Io, the PWM driving signals are generated to be applied to the individual semiconductor switching elements Q1 to Q4, respectively, of the bridge circuit 44 via the wiring conductors L4.

Thus, the motor current IM is supplied to the motor 40 from the battery 41 by way of the external wiring conductors L2, the connector 45, the relay 46, the wiring conductor pattern P4, the shunt resistor 43, the wiring conductor pattern P1, the bridge circuit 44, the wiring conductor pattern P3, the connector 45 and the external wiring conductors L2. The motor 40 is then driven by the motor current IM to generate the assist torque of demanded magnitude in the direction as demanded.

In that case, the motor current IM is detected through the medium of the shunt resistor 43 and the motor current detecting means 48 to be fed back to the subtracting means 57 incorporated in the microcomputer 55, whereby the motor current IM is so controlled as to coincide with the motor current command Im. Incidentally, the motor current IM contains ripple components due to switching operations involved in the PWM driving of the bridge circuit 44. However, the ripple components are suppressed by the smoothing capacitor 42 of a large capacity, to smooth the motor current.

At this juncture, it should be mentioned that the value of the motor current IM controlled by the motor-driven power steering control system of this type is relatively large on the order of 25 amperes even in the case of a low-horse-power motor vehicle and within a range of 60 to 80 amperes in the case of a small-size motor vehicle. Besides, in order to suppress variation or fluctuation of the assist torque, high accuracy is required for the control of the current value.

However, due to variance of the characteristics of the shunt resistor 43 and the parts constituting the motor current detecting means 48, the demanded accuracy of the current value can not be realized without resorting to adjustment. Such being the circumstances, accuracy alignment has heretofore been performed by adjusting the motor current IM through a motor current adjusting process on a production line on a vehicle-by-vehicle basis.

Next, by referring to a circuit diagram shown in FIG. 8 together with FIG. 7, description will be made of adjusting operation or procedure of the motor current IM performed heretofore.

FIG. 8 shows in concrete a circuit arrangement of the motor current detecting means 48 shown in FIG. 7.

Referring to FIG. 8, the motor current detecting means 48 is composed of a comparator CM for comparison of the voltage appearing across the shunt resistor 43, a resistor R1 connected to an input terminal of the comparator CM, an adjusting resistor RA connected in parallel to the resistor R1, a transistor TR operating in response to the output level of the comparator CM and an output resistor Ro inserted between the collector of the transistor TR and the ground potential, wherein a detection signal corresponding to the motor current IM is generated on the basis of the voltage appearing across the shunt resistor 43 to be outputted.

Parenthetically, for the adjusting of the motor current IM, there are employed a measuring unit and a motor current adjusting unit (both not shown) which are provided separately from the microcomputer 55.

For carrying out the adjustment of the motor current, a predetermined pseudo-signal is inputted to the microcomputer 55 from the torque sensor 50 via the relevant input terminal so that a predetermined motor current (e.g. 25 amperes) can flow. At that time point, the current flowing through the steering effort assisting motor 40 is actually measured by means of the measuring unit.

Further, the motor current adjusting unit is so designed as to perform the adjustment of the motor current by selecting sequentially the values of the adjusting resistor RA incorporated in the motor current detecting means 48 so that the actually measured motor current value as measured by the measuring unit lies within a predetermined range (e.g. ±1 ampere) relative to the predetermined motor current (25 amperes).

FIG. 9 is a structural diagram showing a conventional control system for a motor vehicle which includes an internal adjusting mechanism, and more specifically shows an engine control system designed for protecting an exhaust gas system in response to abnormality of the exhaust gas temperature.

Referring to FIG. 9, an exhaust gas temperature sensor 100 designed for detecting the temperature of the exhaust gas of the engine functions as an input unit for a control unit 101. To this end, the exhaust gas temperature sensor 100 may be constituted by a thermocouple such as e.g. chromel-alumel thermocouple (hereinafter referred to also as the CA in abbreviation).

The output signal of the exhaust gas temperature sensor 100 is inputted to a control unit 101 which incorporates a microcomputer 300 as a control means.

The control unit 101 is comprised of an amplifier 200 which is designed for amplifying the output signal of the exhaust gas temperature sensor 100 before inputting it to the microcomputer 300 and which per se is known in the art, a resistor R21 inserted at the input side of the amplifier 200, an adjusting resistor RA1 connected in parallel with the resistor R21, resistors R11 and R12 for determining the gain G of the amplifier 200, and an alarm driving circuit 400 inserted at the output side of the microcomputer 300.

An offset voltage Ve of the amplifier 200 can be adjusted with the aid of the resistor R21 and the adjusting resistor RA1.

The microcomputer 300 includes an A/D (analogue-to-digital) converter 310 for converting the output signal of the amplifier 200 into a corresponding digital signal and a CPU (central processing unit) 320 to which the output signal of the A/D converter 310 is inputted.

The alarm driving circuit 400 can be implemented, for example, by a power transistor and serves as an output control unit (output interface) for the microcomputer 300. The alarm driving circuit 400 responds to the output signal of the microcomputer 300 to drive an alarm lamp 500 connected to the control unit 101. The alarm lamp 500 serves as an output unit for the control unit 101.

Next, description will be directed to operation of the conventional control system for the motor vehicle shown in FIG. 9.

In general, a voltage level of the output signal of the exhaust gas temperature sensor 100 which is constituted by the CA is only on the order of ca. 45 mV for the temperature difference of 1200° C. from a reference point.

On the other hand, the LSB (least significant bit) of the A/D converter 310 incorporated in the microcomputer 300 is about 19.5 mV with resolution of 8 bits and about 4.9 mV with resolution of 10 bits when operated at an ordinary voltage level of 5 volts.

Accordingly, unless the detection value of the exhaust gas temperature is amplified, the microcomputer 300 is only capable of detecting the temperature by a scale unit of 130° C. even with the resolution of 10 bits. As a result of this, even when the alarm lamp 500 is so set that it can not be lit under proper conditions, abnormality of the exhaust gas temperature will be detected, making it impossible to realize the protection of the exhaust gas system.

Under the circumstances, the amplifier 200 is provided for ensuring a sufficiently high detection resolution, as shown in FIG. 9. In this conjunction, when a commercially available operational amplifier, for example, is used as the amplifier 200, an input offset voltage Ve of ca. 7 mV at maximum makes appearance, involving a detection error of 187° C.

Thus, with a view to compensating for the offset error of the operational amplifier (amplifier 200), such an arrangement is heretofore adopted that the adjusting resistor RA1 can be inserted in each control unit 101 (refer to FIG. 9).

When adjustment is performed in the arrangement shown in FIG. 9, the offset error is first measured in the state in which the resistor R21 is connected actually, whereon the appropriate resistance value of the adjusting resistor RA1 is arithmetically determined and then the adjusting resistor RA1 set to the resistance value as determined is connected in parallel to the resistor R21.

However, because the adjusting resistor RA1 generally exhibits discrete resistance values, it is practically impossible to realize the adjustment with high accuracy.

Furthermore, a space for accommodating the adjusting resistor RA1 is required to be reserved in advance. Besides, a step for connecting the adjusting resistor RA1 is additionally involved. These factors thus provide causes for increasing the manufacturing cost of the control unit 101.

Of course, the adjusting resistor RA1 may be constituted by a semi-fixed type variable resistor or alternatively by a resistor film deposited on a ceramic chip so that it can be trimmed by using a laser beam. In that case, however, not only the resistor itself is of high price but also expensive adjusting device is required, not to say of a lot of time taken for the adjustment. Consequently, the manufacturing cost of the control unit 101 will further be increased.

Additionally, it is noted that with the conventional arrangement, the number of adjusting parts increases substantially in proportion to the number of adjustments, which is of course accompanied with increase in the time taken for the adjustment. Thus, the manufacturing cost increases remarkably, to a great disadvantage.

As is apparent from the foregoing, in the conventional control systems for the motor vehicle known heretofore, adjustment is carried out by measuring the motor current IM flowing through the steering effort assisting motor 40 in the state in which only the resistor R1 constituting a part of the motor current detecting means 48 is mounted, whereon the adjusting resistor RA having been set to the proper resistance value as selected is connected in parallel with the resistor R1 in the system shown in FIG. 7 and FIG. 8.

Similarly, in the case of the system shown in FIG. 9, the offset error is measured in the state in which only the resistor R21 constituting a part of the control unit 101 has been mounted, whereon the adjusting resistor RA1 having an appropriate value determined arithmetically is connected in parallel with the resistor R21.

However, in any one of the cases mentioned above, the adjusting resistors RA and RA1 exhibit discrete resistance values. Consequently, the adjustment can not be realized with desired accuracy, giving rise to a problem.

Besides, because a space for mounting the adjusting resistor RA or RA1 has to be secured in advance, the apparatus will have to be implemented in a large size. Further, an additional step is required for the connection of the adjusting resistor RA or RA1. Thus, the manufacturing cost is increased, giving rise to another problem.

Moreover, the device for the adjustment is intrinsically very expensive and requires a lot of time for the adjustment, which ultimately results in increase of the manufacturing cost of the control system as a whole, giving rise to yet another problem.

The present invention has been made in an effort to solve the problems such as mentioned above and contemplates as an object to provide a control system for the motor vehicle which is equipped with an inexpensive and precise adjusting means.

DISCLOSURE OF THE INVENTION

The control system for a motor vehicle according to the present invention comprises a control unit which includes a non-volatile memory device, a control means for arithmetically determining a desired control quantity for the motor vehicle by using information stored in the memory device, and an input control unit and an output control unit provided in association with the control means, wherein intrinsic information of the control unit is stored in the memory device.

Further, the control means of the control system for the motor vehicle according to the present invention may include a correcting means for correcting the desired control quantity on the basis of the intrinsic information.

Furthermore, the intrinsic information stored in the memory device of the control system for the motor vehicle according to the present invention may contain information concerning characteristic of at least one of the input control unit and the output control unit.

Further, the intrinsic information stored in the memory device of the control system for the motor vehicle according to the present invention may contain an absolute value of the control quantity measured under predetermined conditions.

Further, the intrinsic information stored in the memory device of the control system for the motor vehicle according to the present invention may contain deviation of intrinsic characteristic of the control unit from standard characteristic.

Furthermore, in the control system for the motor vehicle according to the present invention, at least a part of control software for the control means may be stored in the memory device.

Further, the control system for the motor vehicle according to the present invention may include a memory supplementing unit connected to the control unit, wherein the memory supplementing unit is used for storing the intrinsic information in the memory device incorporated in the control unit.

Furthermore, the memory device of the control system for the motor vehicle according to the present invention may be constituted by a flash memory.

Further, the memory device of the control system for the motor vehicle according to the present invention may be constituted by an electrically erasable programmable read-only memory or EEPROM.

Furthermore, the control system for the motor vehicle according to the present invention comprises a control unit including a non-volatile memory device, a control means for arithmetically determining a desired control quantity for the motor vehicle by using information stored in the memory device, and an input control unit and an output control unit provided in association with the control means, an input unit connected to the control means by way of the input control unit, and an output unit connected to the control means by way of the output control unit, wherein intrinsic information containing characteristic of at least one of the control means, the input control unit, the output control unit, the input unit and the output unit is stored in the memory device.

Further, the intrinsic information stored in the memory device of the control system for the motor vehicle according to the present invention may contain deviation or difference between the intrinsic characteristic of at least one of the control means, the input control unit, the output control unit, the input unit and the output unit and standard characteristic.

By virtue of the arrangements described above, the intrinsic information indicating variances in the characteristics of the individual units can be stored previously in an inexpensive memory device through simple processing procedure, whereby the control system for the motor vehicle having excellent performances can be realized at low costs, which allows accurate adjustment to be realized through a simplified adjusting step while reducing an extraneous space for adjustment of variance without need for use of high-precision and expensive parts.

BEST IMPLEMENTATION MODES FOR CARRYING OUT THE INVENTION

Implementation Mode 1

Figure 1:
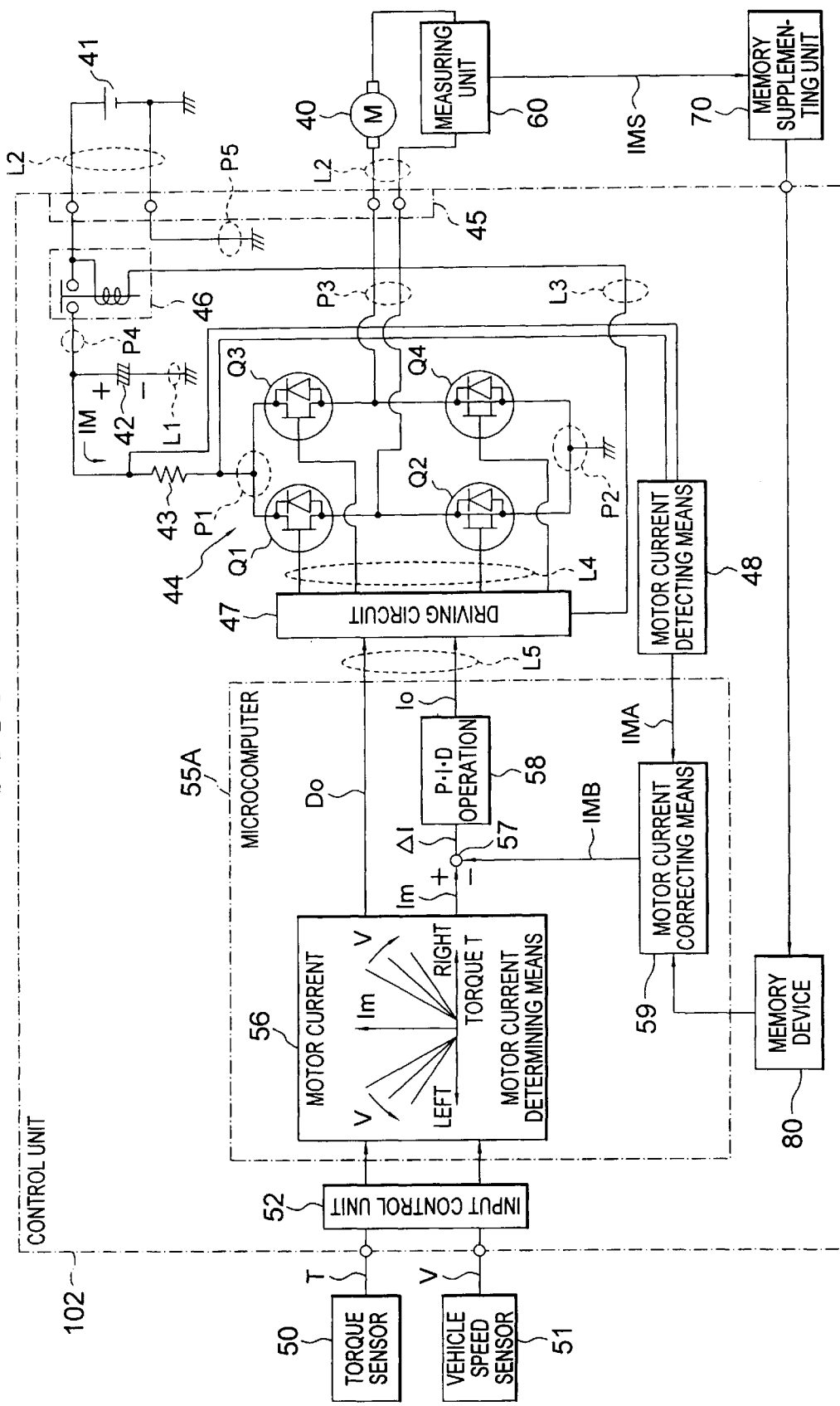
FIG. 1 is a diagram showing an arrangement of a motor-driven power steering control system according to a first implementation mode of the present invention and shows a case where adjustment of a motor current is performed.
Figure 7:
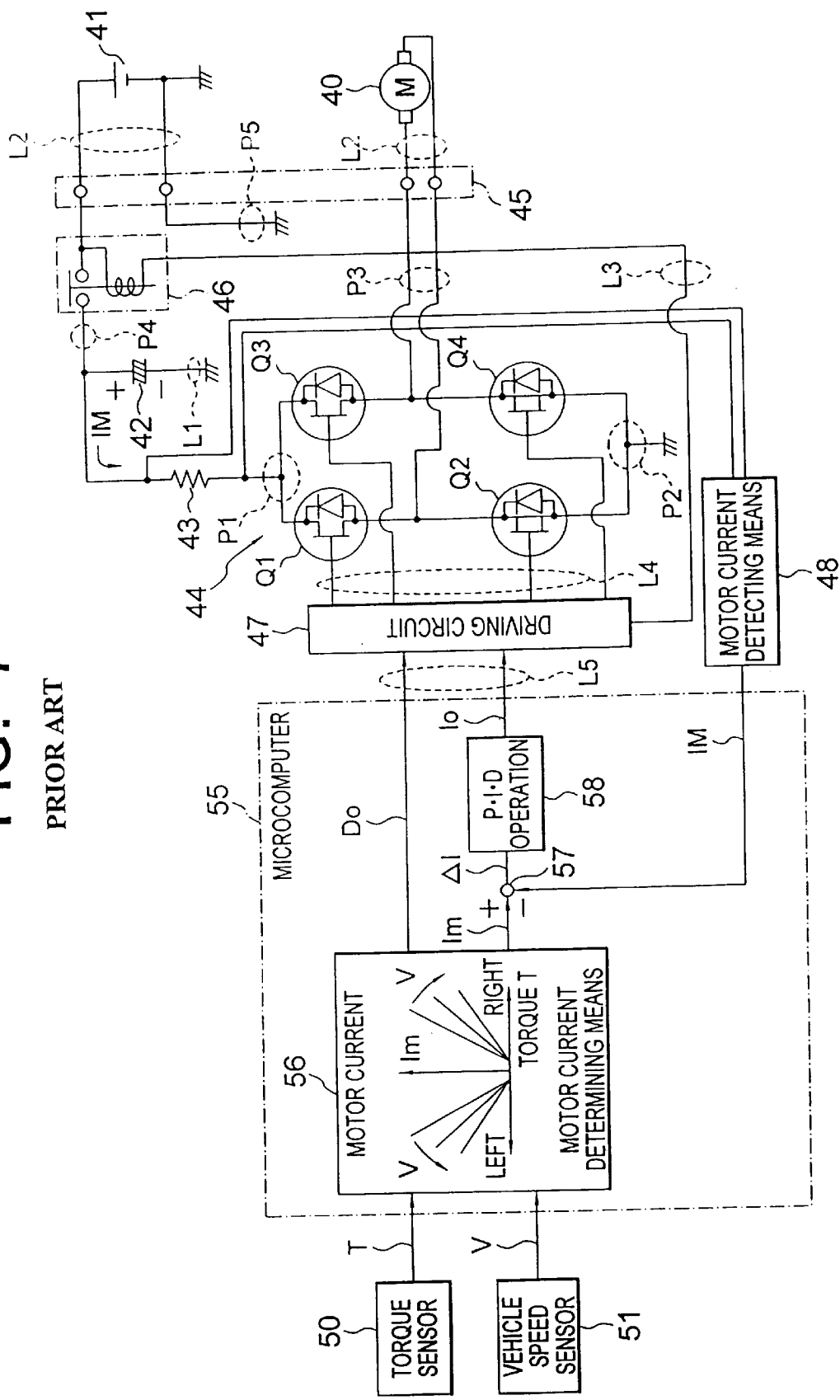
FIG. 7 is a diagram showing an arrangement of a conventional motor-driven power steering control system known heretofore.
Figure 8:
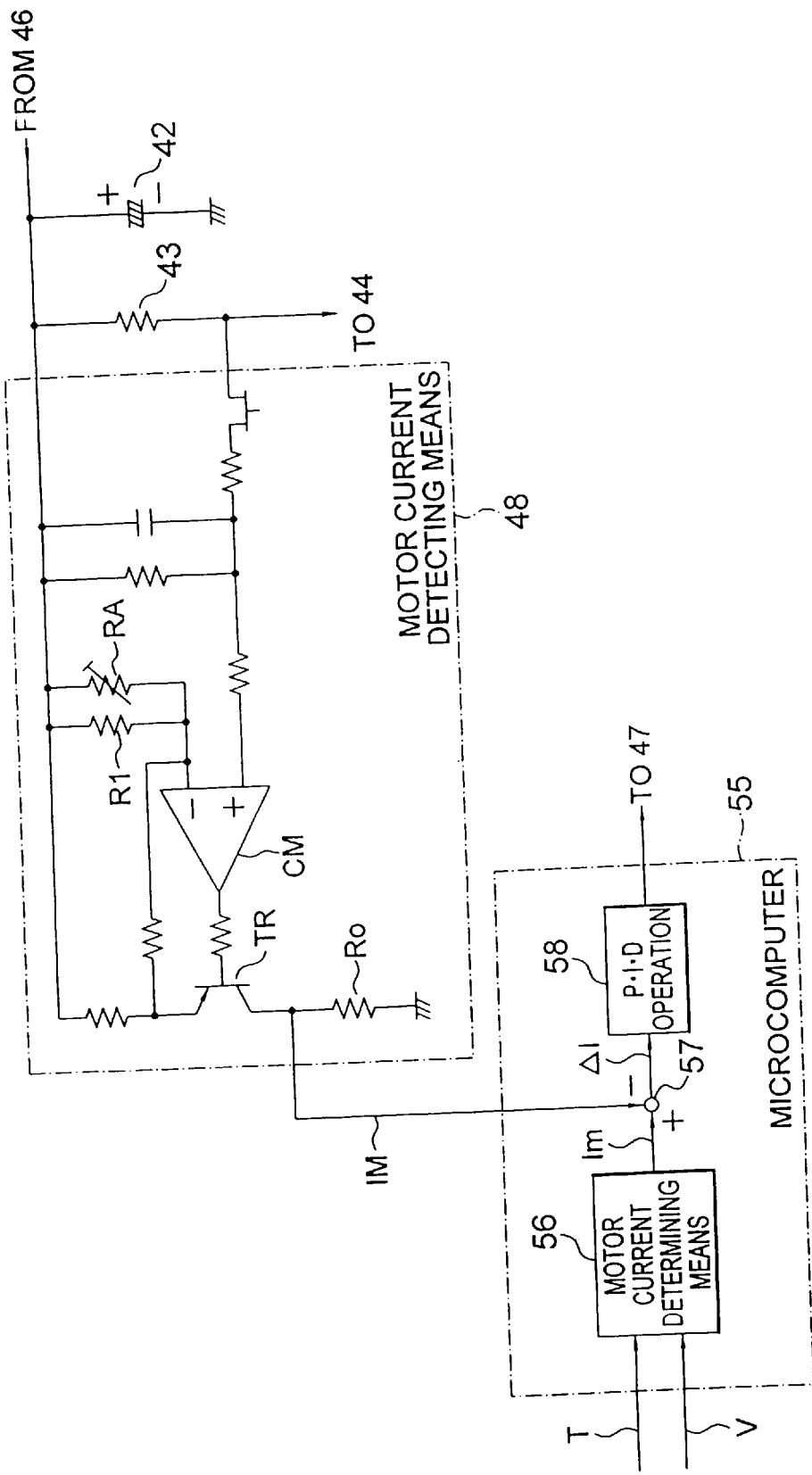
FIG. 8 is a circuit diagram showing in concrete an exemplary arrangement of a motor current detecting means shown in FIG. 7.

FIG. 1 is a structural diagram showing an first implementation mode of the present invention and shows, by way of example, a motor-driven power steering control system in which an motor current IM is to be adjusted, similarly to the case described hereinbefore (see FIG. 7).

Referring to FIG. 1, the system shown therein is identical with the one described hereinbefore (see FIG. 7) except that an input control unit 52, a motor current correcting means 59, a measuring unit 60, a memory supplementing unit 70 and a memory device 80 are additionally provided, wherein components similar to those described hereinbefore are denoted by like reference characters and detailed description thereof is omitted.

A microcomputer 55A serving as the control means constitutes an electronic control unit in cooperation with peripheral interfaces as in the case of the system described hereinbefore.

A control unit 102 constituting a main portion of the motor-driven power steering control system includes an input control unit 52 inserted at the input side of the microcomputer 55A at which sensor signals T and V are inputted and a non-volatile memory device 80 inserted at the input side of the microcomputer 55A at which data fed back are inputted.

The microcomputer 55A is equipped with a motor current correcting means 59, wherein the motor current correcting means 59 is inserted between the memory device 80 and the subtracting means 57 with a motor current corrected value IMB being inputted to the subtracting means 57.

The steering effort assisting motor 40 is provided with a measuring unit 60 for measuring an actual value IMS of the motor current IM.

Further, connected to the measuring unit 60 is a memory supplementing unit 70 serving as an information writing means, wherein the memory supplementing unit 70 is so designed as to store data value based on the actual motor current value IMS in the memory device 80 as the intrinsic information for each of the individual control units 102 as employed.

Parenthetically, it should be mentioned that the measuring unit 60 and the memory supplementing unit 70 are used only upon adjustment of the motor current IM. In this conjunction, the function of the measuring unit 60 may be incorporated in the memory supplementing unit 70.

Next, referring to flow charts shown in FIG. 2 and FIG. 3, operation of the system according to the first implementation mode of the present invention shown in FIG. 1 will be described.

Figure 2:
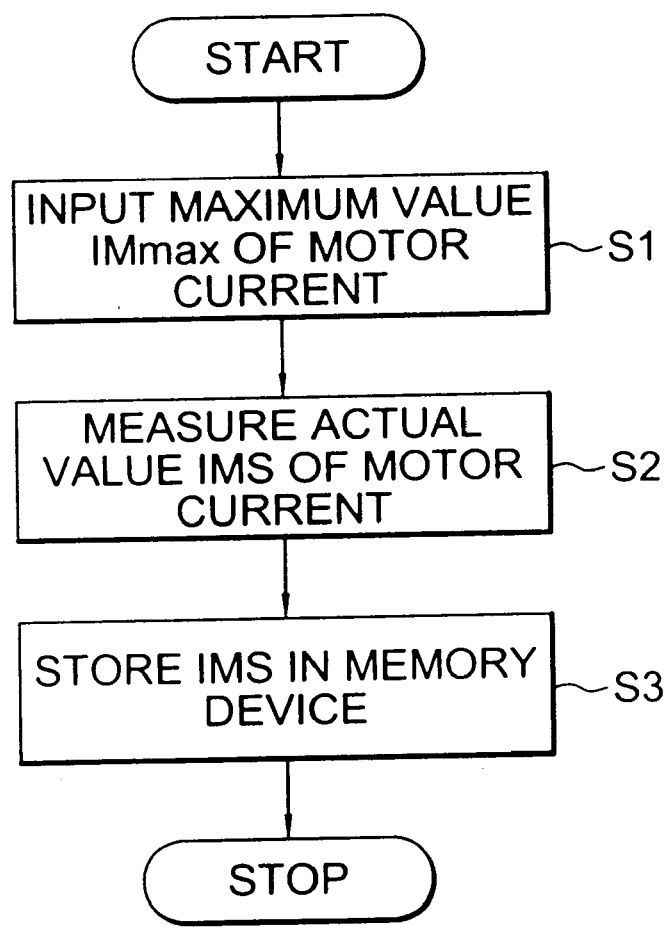
FIG. 2 is a flow chart illustrating processing procedure for adjustment of the motor current in the motor-driven power steering control system according to the first implementation mode of the present invention.
Figure 3:
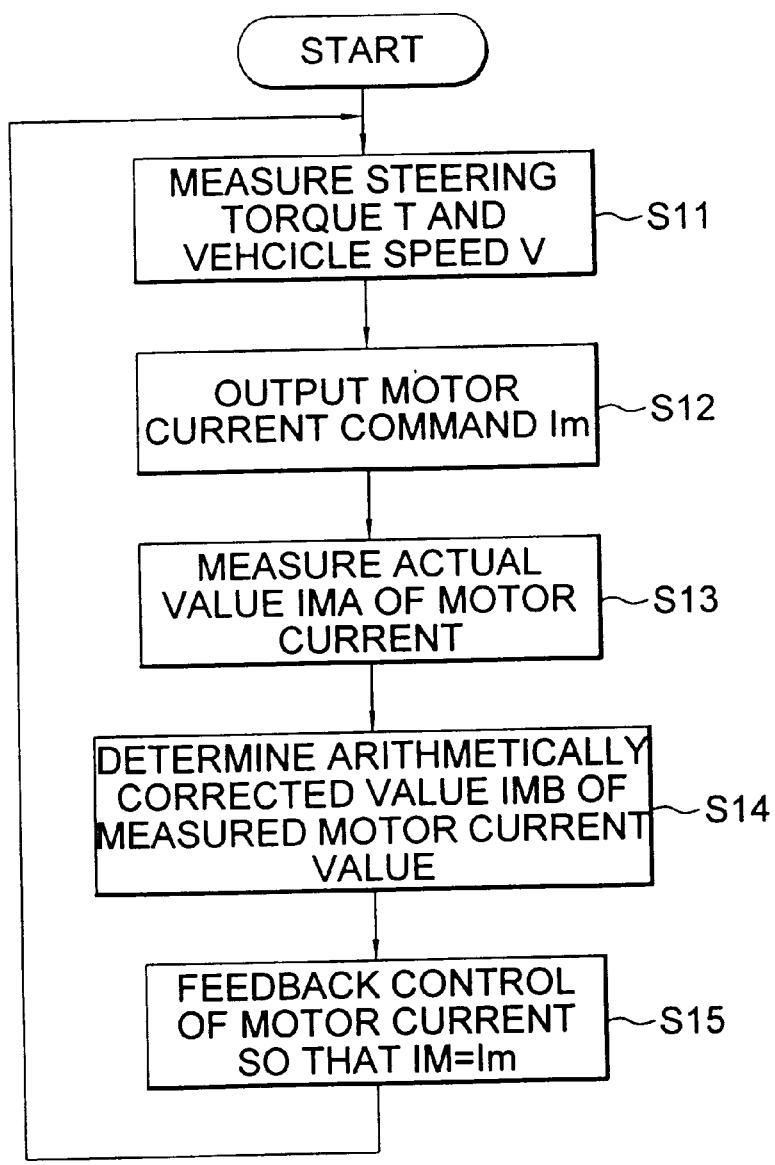
FIG. 3 is a flow chart for illustrating an ordinary control operation of the motor-driven power steering control system for the motor vehicle according to the first implementation mode of the present invention after the adjustment of the motor current.

FIG. 2 shows processing procedure for adjustment of the motor current, and FIG. 3 shows processing procedure for an ordinary control.

At first, for adjusting the motor current (refer to FIG. 2), a pseudo-signal is inputted to the control unit 102 from an input terminal provided for the torque sensor 50 so that a predetermined motor current IMmax corresponding to a maximum value (e.g. IMmax=25A) can flow (step S1).

This pseudo-signal is inputted to the microcomputer 55A by way of the input control unit 52. At this time point, the current flowing through the motor 40 is measured as the actual motor current value IMS by means of the measuring unit 60 (step S2).

Finally, the actual value IMS of the motor current IM is stored in the memory device 80 by using the memory supplementing unit 70 (step S3), whereupon the motor current adjusting routine shown in FIG. 2 comes to an end.

Next, description will be made of ordinary control operation after the completed adjustment of the motor current. In this case, neither the measuring unit 60 nor the memory supplementing unit 70 is put into operation.

Referring to FIG. 3, the motor current determining means 56 incorporated in the microcomputer 55A fetches at first the steering torque T detected by the torque sensor 50 and the vehicle speed V measured by the vehicle speed sensor 51 (step S11), whereon the motor current command Im corresponding to the steering torque T and the vehicle speed V is outputted to the subtracting means 57 (step S12).

On the other hand, the motor current detecting means 48 detects the actual motor current value IMA corresponding to the motor current command Im with the aid of the shunt resistor 43 (step S13), whereon the actual motor current value IMA undergoes the analogue-to-digital conversion to be subsequently inputted to the motor current correcting means 59 incorporated in the microcomputer 55A.

In succession, the actual motor current value IMA undergone the A/D conversion is multiplied by a motor current correcting coefficient K (=IMS/IMmax) for proportional correction of the actual motor current value IMA by means of the motor current correcting means 59, to thereby determine a corrected value IMB in accordance with the following expression (1) (step S14), whereon the corrected value IMB is inputted to the subtracting means 57.

$$IMB = IMA \cdot K \quad (1)$$
$$= IMA \cdot IMS / IMmax$$

Thus, the deviation ΔI (=Im−IMB) between the motor current command Im and the motor current corrected value IMB is determined by the subtracting means 57 to be subsequently inputted to the PID arithmetic means 58.

Finally, the PID arithmetic means 58 performs the feed-back control of the motor current IM so that the motor current IM becomes equal to the motor current command Im (step S15), whereupon the ordinary control routine shown in FIG. 3 comes to an end.

As is apparent from the foregoing, by providing the non-volatile memory device 80 internally of the control unit 102 and by storing in the memory device 80 the intrinsic characteristics of the shunt resistor 43 and the motor current detecting means 48 incorporated in the control unit 102 through the medium of the memory supplementing unit 70, there can be realized a precise control system for the motor vehicle at low cost without need for any special part for adjustment and any especial adjusting step.

Parenthetically, as the non-volatile memory device 80, there is usually employed an inexpensive flash memory which can facilitate the storing processing. However, it goes without saying that an EEPROM may be used in place of the flash memory, substantially to the similar effect. When the EEPROM is used, the control system for the motor vehicle can be realized at lower cost although storage capacity is reduced when compared with the flash memory.

Implementation Mode 2

Figure 9:
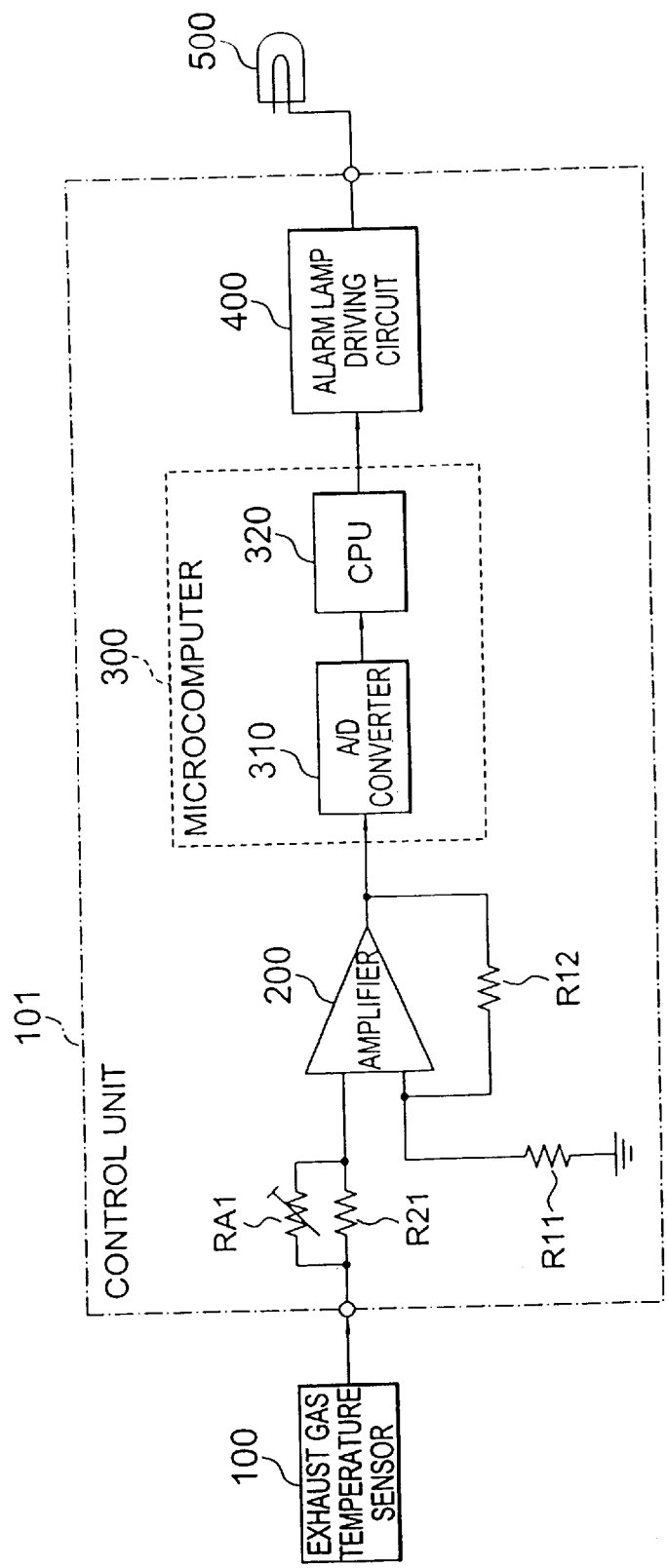
FIG. 9 is a structural diagram showing a conventional control system for a motor vehicle which includes an internal adjusting mechanism.

In the case of the first implementation mode described above, the present invention is applied to the motor-driven power steering control system as a control system for a motor vehicle. However, the invention can equally be applied to an engine control system for a motor vehicle, similarly to the case described hereinbefore (see FIG. 9).

Figure 4:
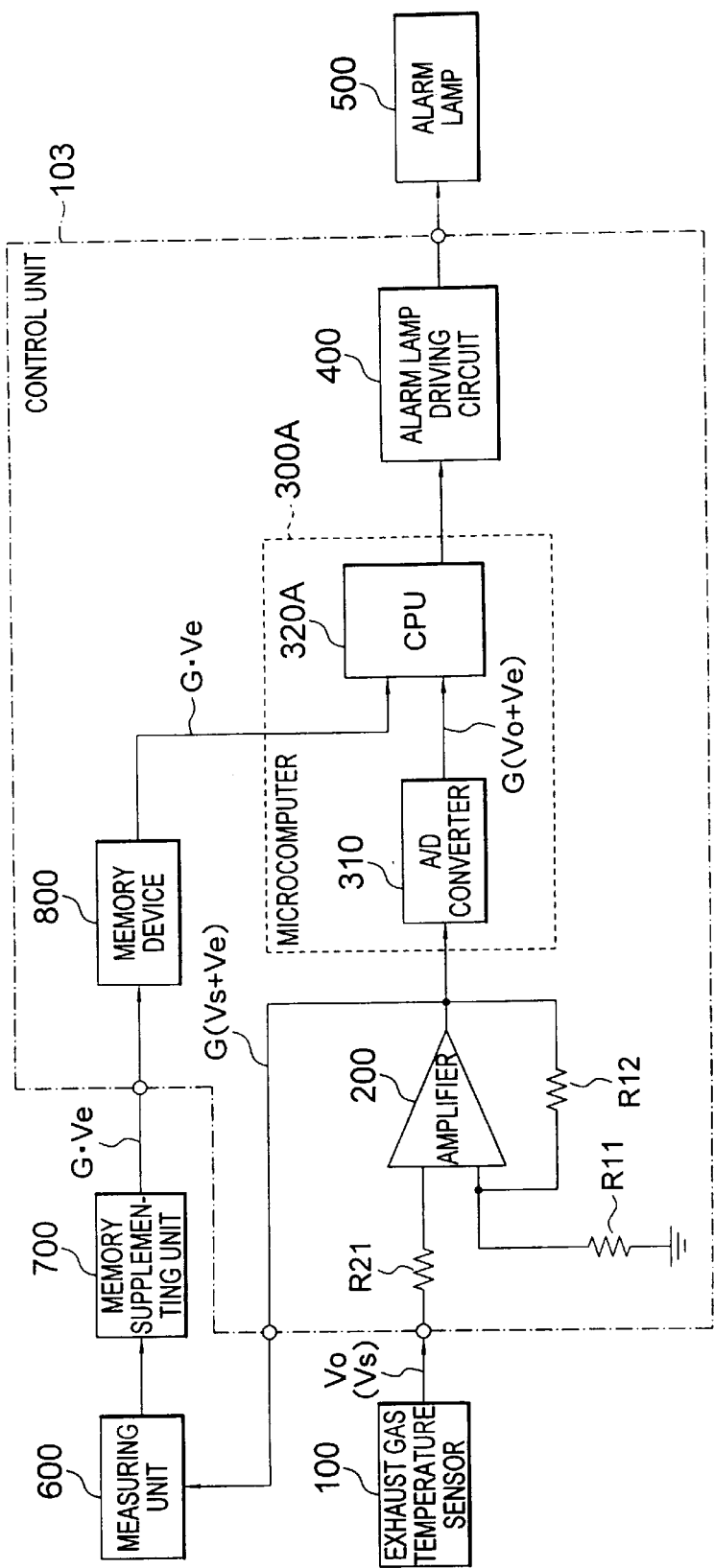
FIG. 4 is a block diagram showing an arrangement of an engine control system for a motor vehicle which includes adjusting means according to a second implementation mode of the present invention.

FIG. 4 is a block diagram showing an arrangement of a second implementation mode of the present invention applied to an engine control system for a motor vehicle for adjusting the offset error of the amplifier 200 as described hereinbefore.

Referring to FIG. 4, the system shown therein is identical with the one described hereinbefore (see FIG. 9) except that a measuring unit 600, a memory supplementing unit 700 and a memory device 800 are additionally provided and that the adjusting resistor RA1 is spared, wherein components similar to those are denoted by like reference characters and detailed description thereof is omitted.

In the case of the instant implementation mode, a control unit 103 constituting a major portion of the engine control system for the motor vehicle includes a non-volatile memory device 800 inserted at the input side of a microcomputer 300A at which the fed-back data are inputted.

Further, a CPU 320A incorporated in the microcomputer 300A includes a correcting means (not shown) similar to the motor current correcting means 59 described hereinbefore (see FIG. 1), wherein the correcting means of the CPU 320A is designed to correct a desired control quantity for an alarm lamp 500 (output unit) on the basis of the information stored in the memory device 800.

A memory supplementing unit 700 provided externally of the control unit 103 serves for the function to store the measured value outputted from the measuring unit 600 in the memory device 800 as the intrinsic information of the control unit 103. At this juncture, it should be mentioned that the memory supplementing unit 700 may be so designed as to additionally serve for the function of the measuring unit 600.

Next, referring to flow charts shown in FIG. 5 and FIG. 6, operation of the system according to the second implementation mode of the present invention shown in FIG. 4 will be described.

Figure 5:
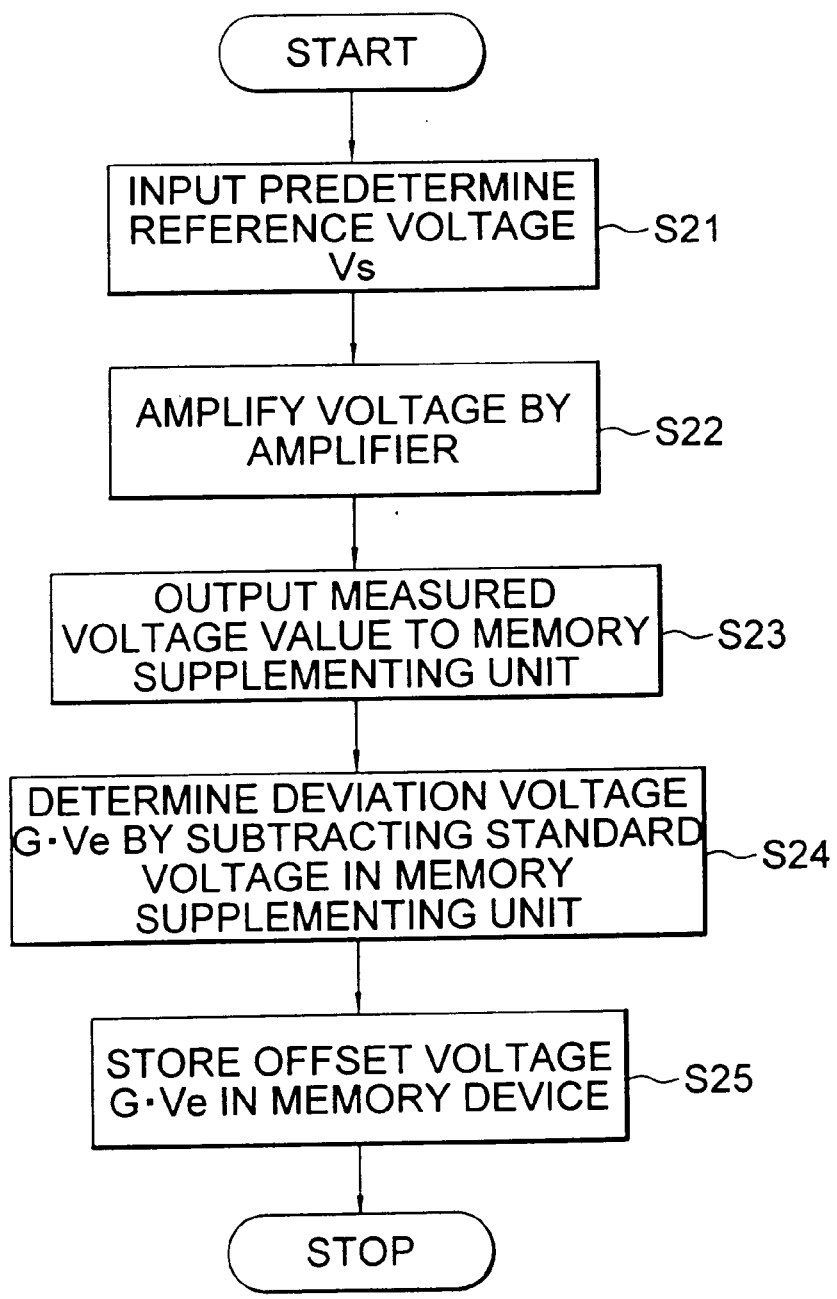
FIG. 5 is a flow chart for illustrating adjusting procedure in the engine control system for the motor vehicle according to the second implementation mode of the present invention.
Figure 6:
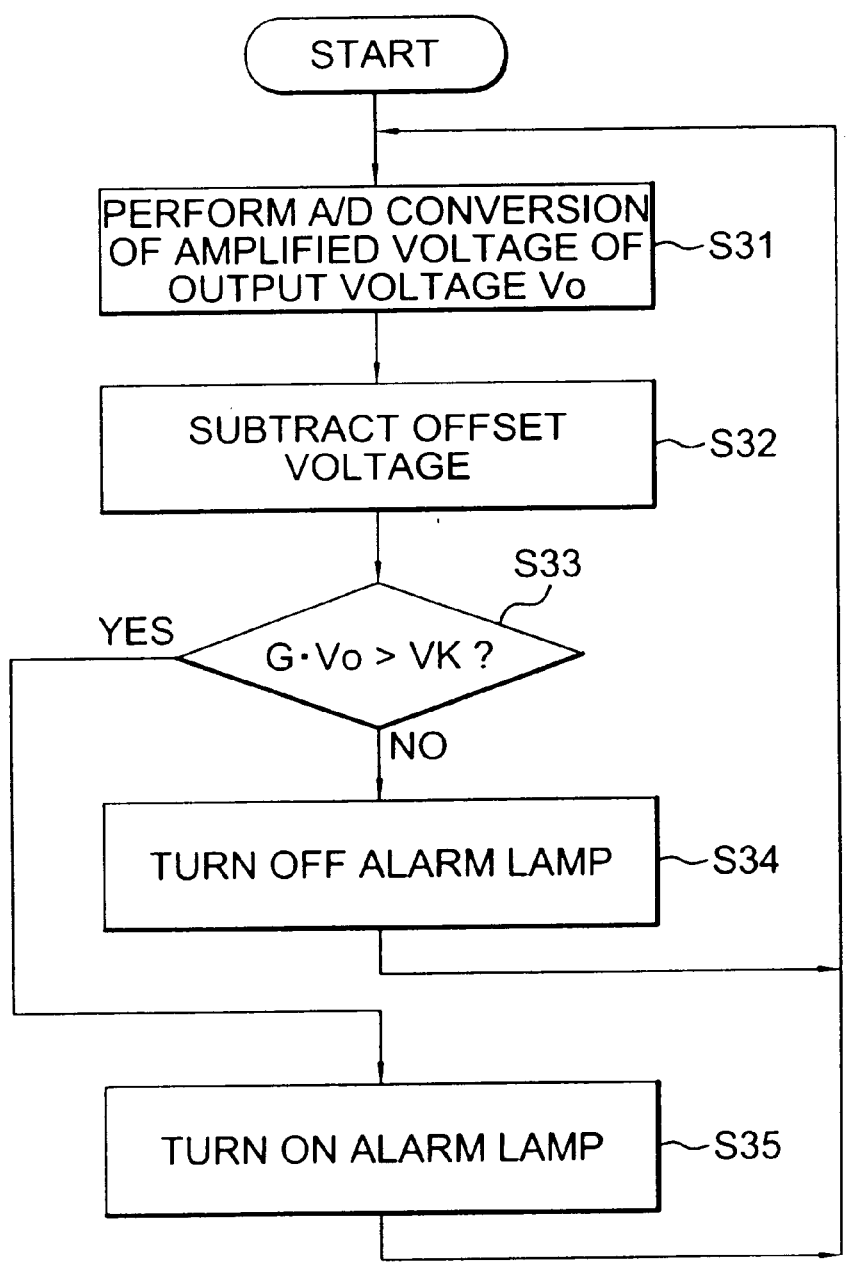
FIG. 6 is a flow chart for illustrating operations of the engine control system for the motor vehicle according to the second implementation mode of the present invention.

FIG. 5 illustrates processing procedure upon adjustment of the intrinsic characteristic, and FIG. 6 illustrates processing procedure for an ordinary control after the storage of the intrinsic information.

At first, for adjusting of the measured offset value (refer to FIG. 5), a known reference voltage Vs is inputted to the amplifier 200 provided internally of the control unit 103 via an input terminal located at the side of the exhaust gas temperature sensor 100 (input unit) (step S21).

In this conjunction, it is noted that the amplifier 200 has an intrinsic input offset voltage Ve as mentioned hereinbefore and that the gain G of the amplifier 200 is determined on the basis of resistors R11 and R12 in accordance with the following expression (2):

$$G = (R11 + R12)/R11 \quad (2)$$

Thus, the amplifier 200 amplifies the reference voltage Vs and the input offset voltage Ve by a factor equal to the gain G, to thereby supply a voltage G·(Vs+Ve) to the A/D converter 310 (step S22).

The measuring unit 600 measures the output voltage G·(Vs+Ve) of the amplifier 200, whereon the measured value undergoes A/D conversion to be subsequently inputted to the memory supplementing unit 700 (step S23).

The memory supplementing unit 700 arithmetically determines a deviation or difference voltage (=G·Ve) between the measured voltage value G·(Vs+Ve) originating in the measuring unit 600 and a known standard voltage (=G·Vs) (step S24), whereon the deviation voltage G·Ve is stored in the memory device 800 as the intrinsic information (step S25).

At this juncture, it should be mentioned that the standard voltage G·Vs is known from the output characteristic of the amplifier 200 and that the deviation voltage G·Ve (=G·(Vs+Ve)−G·Vs) between the measured voltage value G·(Vs+Ve) and the standard voltage G·Vs corresponds to the input offset voltage Ve of the amplifier 200.

Accordingly, in the step S25, a digital value of the deviation voltage G·Ve corresponding to the input offset voltage Ve of the amplifier 200 is stored in the non-volatile memory device 800.

Now, the offset adjusting routine illustrated in FIG. 5 comes to an end.

Next, description will be directed to an ordinary control operation in succession to the completion of the offset adjusting processing procedure. In this case, neither the measuring unit 600 nor the memory supplementing unit 700 is put into operation.

FIG. 6 illustrates an ordinary control operation performed by the control software executed by the control unit 103. More specifically, there is illustrated a processing procedure for performing the ordinary control by making use of the deviation voltage G·Ve (intrinsic information) stored in the memory device 800.

At first, the amplifier 200 incorporated in the control unit 103 amplifies the exhaust gas temperature Vo (output voltage) from the exhaust gas temperature sensor 100 (input unit), whereon the amplified voltage G·(Vo +Ve) is inputted to the A/D converter 310 provided internally of the microcomputer 300A.

Thus, the amplified voltage G·(Vo+Ve) undergone the A/D conversion through the A/D converter 310 (step S 31) is inputted to the CPU 320A, as shown in FIG. 6.

On the other hand, the correcting means provided internally of the CPU 320A subtracts the deviation voltage G·Ve stored in the memory device 800 (which corresponds to the input offset voltage of the amplifier 200) from the amplified voltage G·(Vo+Ve) undergone the A/D conversion (step S32).

In succession, the digital value of the amplified voltage G·Vo resulting from amplification of the output voltage Vo by the gain G is compared with a decision reference voltage VK to thereby make decision as to whether or not the amplified voltage G·Vo exceeds the decision reference voltage VK (corresponding to an abnormal temperature) (step S33).

When the detected temperature outputted from the exhaust gas temperature sensor 100 is low and thus it is decided in the step S33 that G·Vo≦VK (i.e.,"NO"), the alarm lamp 500 is turned off (step S34), whereon the step S31 is resumed.

On the other hand, when the detected temperature outputted from the exhaust gas temperature sensor 100 exceeds the abnormal level and thus it is decided that G·Vo>VK (i.e.,"YES"), the alarm lamp 500 is turned on so as to validate an alarm driving processing (step S35), whereon return is made to the step S31.

In the above description directed to the second implementation mode, the deviation voltage G·Ve corresponding to the offset voltage Ve of the amplifier 200 is made use of as the intrinsic information to be stored in the memory device 800 through the medium of the memory supplementing unit 700 for adjusting the offset. However, the absolute value of the measured voltage value G(Vs+Ve) itself may equally be used as the intrinsic information.

In that case, there may be stored in the memory device 800 not only the absolute value of the measured voltage value G(Vs+Ve) but also the standard voltage G·Vs as a part of the control program to be executed by the microcomputer 300A.

Further, in the step S32 shown in FIG. 6, the CPU 320A incorporated in the microcomputer 300A adds the standard voltage G·Vs to the voltage value G(Vo+Ve) undergone the A/D conversion before subtraction of the absolute value G(Vs+Ve) stored in the memory device 800.

Through this procedure, the value equivalent to the detection voltage G·Vo can be determined with high accuracy, similarly to the case described hereinbefore, whereby decision in the step S33 can be made with high reliability.

Further, in the second implementation mode described previously, the reference voltage Vs is inputted independent of the output voltage Vo of the exhaust gas temperature sensor 100 constituted by the CA in the step S21 for the offset adjustment. However, as an alternative, the atmosphere may be set to a predetermined reference temperature (e.g. room temperature of 25° C.) controlled with high accuracy in the state when the exhaust gas temperature sensor 100 (input unit) has been actually connected.

In that case, by measuring the output voltage of the amplifier 200 in the state where the predetermined reference temperature prevails and then storing in the memory device 800 an error or difference between the actual output voltage of the amplifier 200 and the known voltage based on the reference temperature through the medium of the memory supplementing unit 700, it is possible to realize the adjustment not only of the offset component of the amplifier 200 but also of the error component of the input unit 100.

Furthermore, in the second implementation mode described previously, the alarm lamp 500 connected to the control unit 103 is employed as the output unit, wherein the output voltage of the amplifier 200 is measured for adjusting the control quantity for the alarm lamp 500. However, as an alternative, the drive state of the output unit may be measured.

By way of example, in the case where the output unit is constituted by a linear solenoid (not shown), stroke (position) characteristic of the linear solenoid may be measured as a function of the solenoid current to thereby store in the non-volatile memory device 800 the error component of the position characteristic relative to the linear solenoid current. In this way, the error component of the output unit can be canceled out.

As is apparent from the foregoing, by storing as the intrinsic information the characteristics of the input/output control units (such as the amplifier 200, the alarm driving circuit 400, etc.) incorporated in the control unit 103 as well as the characteristics of the input/output units (such as the exhaust gas temperature sensor 100, the alarm lamp 500, etc.) connected definitely to the input/output units, there can be realized inexpensively a precise control system for the motor vehicle without resorting to the use of the specific part for adjusting or especial adjusting step or steps.

In the implementation modes described above, the control system for the motor vehicle is implemented as the motor-driven power steering control system (see FIG. 1) or the engine control system for the motor vehicle (see FIG. 4). However, it goes without saying that the invention can equally be applied to other control systems for the motor vehicle equipped with appropriate input unit(s) and output unit(s) for performing similar adjustment with regard to the control quantity of a given output unit, to substantially same actions and effects as those described hereinbefore.

Additionally, in the implementation modes described above, only the intrinsic information corresponding to variance of the characteristic is stored in the memory device 80 or 800. However, such intrinsic information may be stored as a part or parts of the control program (e.g. control program for the adjustment) executed by the microcomputer 55A or 300A (control means).

In that case, by storing in advance the contents of the intrinsic information and the processing procedure in the memory device 80 or 800 as the control program for the adjustment, the microcomputer 55A or 300A can perform intrinsic information write operation for the memory device 80 or 800 by reading out the control program from the memory device 80 or 800 through the medium of the memory supplementing unit 70 or 700 for the adjustment.

In that case, the memory supplementing unit 70 or 700 may be connected to the microcomputer 55A or the control means 300A.

On the other hand, by using a flash memory as the memory device 80 or 800, the intrinsic information and the control program can be written instantaneously. Additionally, an EEPROM may be used as the non-volatile memory device 800 in place of the flash memory, substantially to the similar effect.

INDUSTRIAL APPLICABILITY

As is apparent from the foregoing description, by providing the non-volatile memory device 80 or 800 such as a flash memory and measuring the intrinsic information containing detection error due to variances in the characteristic of the motor current detecting means 48, the amplifier 200 or the like, storing the measured values in the memory device 80 or 800 through the medium of the memory supplementing unit 70 or 700 and carrying out arithmetic operations by using software contained in the microcomputer 55A or 300A in the ordinary control, the control quantity can be adjusted with high accuracy.

Additionally, because the intrinsic information representing variances in the characteristics of the individual units can be discriminatively stored in advance in the inexpensive memory device 80 or 800 through simple processing procedure, the control system for the motor vehicle which exhibits excellent performance can be realized inexpensively since adjustment of the characteristic variance can be performed through simplified adjusting step without resorting to the use of high-precision and expensive specific parts, especial adjusting processes or the like and without need for providing extraneous accommodation space.

What is claimed is:

1. A control system for a motor vehicle comprising a control unit, said control unit comprising:
   a non-volatile memory device, control means for arithmetically determining a desired control quantity for the motor vehicle by using information stored in said memory device, and
   an input control unit and an output control unit provided in association with said control means, wherein intrinsic information corresponding to characteristics of said control unit which is measured during adjustment of the control unit is stored in said memory device, and said control means corrects said desired control quantity on the basis of said intrinsic information.

2. A control system for a motor vehicle set forth in claim 1, wherein said control means includes correcting means for correcting said desired control quantity on the basis of said intrinsic information.

3. A control system for a motor vehicle set forth in claim 1, wherein the intrinsic information stored in said memory device comprises information concerning characteristic of at least one of said input control unit and said output control unit.

4. A control system for a motor vehicle set forth in claim 3, wherein said intrinsic information further comprises an absolute value of said control quantity measured under predetermined conditions.

5. A control system for a motor vehicle set forth in claim 3, wherein the intrinsic information stored in said memory device further comprises a deviation of the intrinsic characteristic of said control unit from standard characteristic.

6. A control system for a motor vehicle set forth in claim 1, wherein at least a part of control software for said control means is stored in said memory device.

7. A control system for a motor vehicle set forth in claim 1, further comprising a memory supplementing unit connected to said control unit for storing said intrinsic information in said memory device incorporated in said control unit.

8. A control system for a motor vehicle set forth in claim 1, wherein said memory device comprises a flash memory.

9. A control system for a motor vehicle set forth in claim 1, characterized in that said memory device is constituted by an electrically erasable programmable read-only memory.

10. A control system for a motor vehicle comprising:
    a control unit including a non-volatile memory device, control means for arithmetically determining a desired control quantity for the motor vehicle by using information stored in said memory device, and an input control unit and an output control unit provided in association with said control means,
    an input unit connected to said control means by way of said input control unit, and
    an output unit connected to said control means by way of said output control unit, wherein
    intrinsic information corresponding to characteristics of at least one of said control means, said input control unit, said output control unit, said input unit and said output unit is stored in said memory device, and
    said control means includes correcting means for correcting said desired control quantity on the basis of said intrinsic information.

11. A control system for a motor vehicle set forth in claim 10, wherein said control means includes correcting means for correcting said desired control quantity on the basis of said intrinsic information.

12. A control system for a motor vehicle set forth in claim 10, wherein said intrinsic information comprises an absolute value of said control quantity measured under predetermined conditions.

13. A control system for a motor vehicle set forth in claim 10, wherein the intrinsic information stored in said memory device comprises a deviation between the intrinsic characteristic of at least one of said control means, said input control unit, said output control unit, said input unit and said output unit, and a standard characteristic.

14. A control system for a motor vehicle set forth in claim 10, wherein at least a part of control software for said control means is stored in said memory device.

15. A control system for a motor vehicle set forth in claim 10, further comprising a memory supplementing unit connected to said control unit for storing said intrinsic information in said memory device incorporated in said control unit.

16. A control system for a motor vehicle set forth in claim 10, wherein said memory device comprises a flash memory.

17. A control system for a motor vehicle set forth in claim 10, wherein said memory device comprises an electrically erasable programmable read-only memory.

* * * * *